United States Patent [19]

Chang et al.

[11] Patent Number: 4,695,123
[45] Date of Patent: Sep. 22, 1987

[54] CUTOFF POLARIZER AND METHOD

[75] Inventors: Chin-Lung Chang, Phoenix, Ariz.; John R. Feth, Chatsworth, Calif.

[73] Assignee: Litton Systems, Inc., Beverly Hills, Calif.

[21] Appl. No.: 767,553

[22] Filed: Aug. 20, 1985

[51] Int. Cl.$^4$ .................................................. G02B 5/30
[52] U.S. Cl. .............................. 350/96.15; 350/96.29; 350/395; 350/406
[58] Field of Search ............... 350/96.15, 96.16, 96.29, 350/96.30, 394, 395, 400, 406

[56] References Cited

U.S. PATENT DOCUMENTS

| | | | |
|---|---|---|---|
| 3,625,589 | 12/1971 | Snitzer | 350/96 |
| 3,645,603 | 2/1972 | Smith | 350/149 |
| 4,089,582 | 5/1978 | Mahlien et al. | 350/96.13 |
| 4,139,262 | 2/1979 | Mahlien et al. | 350/96.33 |
| 4,268,116 | 5/1981 | Schmadel et al. | 350/96.29 |
| 4,386,822 | 6/1983 | Bergh | 350/96.15 |
| 4,389,090 | 6/1983 | LeFevre | 350/96.29 |
| 4,410,275 | 10/1983 | Shaw et al. | 356/350 |
| 4,431,260 | 2/1984 | Palmer | 350/96.15 |
| 4,456,377 | 6/1984 | Shaw et al. | 356/350 |
| 4,461,574 | 7/1984 | Shaw et al. | 356/350 |
| 4,515,441 | 5/1985 | Wentz | 350/395 |
| 4,529,312 | 7/1985 | Pavlath et al. | 356/350 |
| 4,583,818 | 4/1986 | Chen et al. | 350/96.19 |
| 4,589,728 | 5/1986 | Dyott et al. | 350/96.30 |
| 4,607,912 | 8/1986 | Burns et al. | 350/96.30 |

FOREIGN PATENT DOCUMENTS

| | | | |
|---|---|---|---|
| 3305104 | 8/1984 | Fed. Rep. of Germany | 350/96.29 |
| 3305104A1 | 8/1984 | Fed. Rep. of Germany | |
| 84/02006 | 5/1984 | World Int. Prop. O | 350/96.15 |

OTHER PUBLICATIONS

Alekseev et al, "Polarization Modulation of the Radiation in a . . . ", Sov. Tech. Phys. Lett., vol. 5, No. 7, Jul. 1979, pp. 367–368.
Eickhoff, "In-Line Fibre-Optic Polariser", Electronics Letters, vol. 16, No. 20, Sep. 1980, pp. 762–763.
Hosaka et al., "Fabrication of Single-Mode Fiber-Type Polarizer", Optics Letters, vol. 8, No. 2, Feb. 1983, pp. 124–126.
Hosaka et al., "Single-Mode Fiber-Type Polarizer", IEEE J. of Q. Elect., vol. QE-18, No. 10, Oct. 1982, pp. 1569–1572.
Mohr, F. A. and Sholz, U., "Polarization Control for an Optical Fiber Gyroscope", Fiber Optic Rotation and Related Technology, Springer Verlag, 1982, pp. 163–168.
Ulrich, R., "Polarization Stabilization on Single-Mode Fiber", Appl. Phys. Lett., 35(11), 12/01/79, pp. 840–842.
Kintner, E. C., "Polarization Problems in Optical Fiber Gyroscopes", Applied Optics, pp. 78–81.
LeFevre et al., "Progress in Optical Fiber Gyroscopes Using Integrated Optics", 12 Pages.
Johnson, M., "In-Line Fiber-Optical Polarization Transformer", Appl. Optics, vol. 18, No. 9, 1 May 1979, pp. 1288–1289.
Pavlath et al, "Fiber-Optic Gyroscopes: Advances and Future Developments", Navigation:Journal of the Institute of Navigation, vol. 31, No. 2, Summer 1984, pp. 70–83.
Flanders, D. C., "Submicrometer Periodicity Gratings As Artificial Anisotropic Dielectrics", Appl. Phys. Lett., 42(6), 15 Mar. 1983, p. 492.
Gruchmann, D. et al., "Fiber-Optic Polarizers with High Extinction Ratio", ECOC-83, 1983, pp. 305–308.

Primary Examiner—John Lee
Attorney, Agent, or Firm—Lynn & Lynn

[57] ABSTRACT

The cladding and a portion of the core of apparatus of a length of optical fiber are removed to form an interaction region where the fiber will not guide a light wave. A metal thin layer placed on the exposed core and a portion of the cladding. Polarizations perpendicular to the metal film couple into the metal film to form a surface plasma wave that propagates parallel to the fiber while parallel polarizations radiate through the metal film. The surface plasma wave couples energy back into the fiber so that the throughput of the polarizer is only the perpendicular polarization component. A photodetector forms an error signal from the polarization radiated from the fiber, and control circuitry processes the error signal to drive a polarization controller that adjusts the polarization of light input to the polarizer to minimize the error signal and maximize the intensity of the desired polarization output from the polarizer.

37 Claims, 8 Drawing Figures

CUTOFF POLARIZER AND METHOD

BACKGROUND OF THE INVENTION

This invention relates generally to apparatus and methods for polarizing light and particularly to apparatus and methods for polarizing light that is propagating in an optical fiber. Still more particularly, this invention relates to a metal clad fiber optic polarizer and methods of fabrication and use thereof.

A polarizer is a device that removes selected polarization components from a light wave. Some familiarity with propagation and polarization of light within an optical fiber will facilitate an understanding of both the present invention and the prior art. Therefore, a brief discussion of fiber optic waveguides, normal modes of propagation of light in such waveguides and polarization of light is presented.

It is well-known that a light wave may be represented by a time-varying electromagnetic field comprising orthogonal electric and magnetic field vectors having a frequency equal to the frequency of the light wave. An electromagnetic wave propagating through a guiding structure can be described by a set of normal modes. The normal modes are the permissible distributions of the electric and magnetic fields within the guiding structure for example a fiber optic waveguide. The field distributions are directly related to the distribution of energy within the structure. The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure having a circular cross section of fixed dimensions, only fields having certain frequencies and spatial distributions will propagate without severe attentuation. The waves having field components that propagate unattenuated are the normal modes.

In describing the normal modes, it is convenient to refer to the direction of the electric and magnetic fields relative to the direction of propagation of the wave. If only the electric field vector is perpendicular to the direction of propagation, which is usually called the optic axis, then the wave is said to be a transverse electric (TE) mode. If only the magnetic field vector is perpendicular to to the optic axis, the wave is a transverse magnetic (TM) mode. If both the electric and magnetic field vectors are perpendicular to the optic axis, then the wave is a transverse electromagnetic (TEM) mode. None of the normal modes require a definite direction of the field components; and in a TE mode, for example, the electric field may be in any direction that is perpendicular to the optic axis.

The direction of the electric field vector in an electromagnetic wave is the polarization of the wave. In general, a wave will have random polarization in which there is a uniform distribution of electric field vectors pointing in all directions permissible for each mode. If all the electric field vectors in a wave point in only one particular direction, the wave is linearly polarized. If the electric field consists of two orthogonal electric field components of equal magnitude and 90° out of phase, the electric field is circularly polarized because the net electric field is then a vector that rotates around the optic axis at an angular velocity equal to the frequency of the wave. If the two linear polarizations have unequal magnitudes and phases that are neither equal nor opposite, the wave has elliptical polarization. In general, any arbitrary polarization can be represented by either the sum of two orthogonal linear polarizations, two oppositely directed circular polarizations or two oppositely directed elliptical polarizations having orthogonal semi-major axes.

The velocity of an optical signal depends upon the index of refraction of the medium through which the light propagates. Certain materials have different refractive indices for different polarizations. A material that has two refractive indices is said to be birefringent. The polarization of the signal propagating along a single mode optical fiber is sometimes referred to as a mode. A standard single mode optical fiber may be regarded as a two mode fiber because it will propagate two waves of the same frequency and spatial distribution that have two different polarizations. Two different polarization components of the same normal mode can propagate through a birefringent material unchanged except for a difference in velocity of the two polarizations.

The amount of birefringence is used herein to mean the difference between the two refractive indices of a medium that guides a light wave. Controlling the amount of birefringence permits the control of the polarization of light signal output from a length of fiber optic material. If the wave propagated by a fiber comprises two linear polarization components, increasing or decreasing the difference between the refractive indices of the fiber provides means for controlling the optical length of the fiber for each of the two polarizations. If the fiber is birefringent, then the two polarization components will be shifted in phase as they propagate along the fiber. Since the velocity of light in an optical fiber is $v = c/n$, where c is the free space velocity of light an n is the refractive index of the fiber, the polarization component having the lower refractive index will have a smaller transit time in the fiber than will the component having the higher refractive index. Many fiber optic systems have operational characteristics that are highly dependent upon the polarization of the light guided by the optical fiber. Such systems include optical gyroscopes and interferometric sensors. In order to obtain measurements of the desired accuracy, it is essential that the light have only a single polarization because only light waves of the same polarization produce the desired interference patterns.

Metal clad fiber optic polarizers based on the difference of approximately two orders of magnitude between the attenuation coefficient between the TE and TM modes have been described and demonstrated in the prior art. Such polarizers employ a relatively thick metal coating over a portion of the core of an optical fiber from which the cladding has been removed. As the wave impinges upon the portion of the cladding having the metallic coating, the distribution of electromagnetic fields changes so that one linear polarization is attenuated much more strongly then the other linear polarization.

Electric field components parallel to the metal coating cause ohmic heat in the metal and are rapidly attenuated. Electric field components perpendicular to the metal coating are attenuated only about 1% as strongly as the perpendicular electric fields. The prior art metal clad polarizers require a long interaction length in order to achieve a high extinction ratio. However, in order to obtain a high extinction ratio, these differential attenuation polarizers incur a high insertion loss. The extinction ratio of a polarizer is the measure of its efficacy in reducing the intensity of an undesired polarization relative to that of a desired polarization. The insertion loss is the ratio of the power of the desired polarization lost by transiting the polarizer relative to the initial power in the desired polarization. Even with a relatively long interaction length, polarizers based on differential attenuation give extinction ratios of about 24 dB when the insertion loss is restricted to an acceptable amount.

Since differential attenuation polarizers convert the energy in the undesired polarization into heat, the intensity of the wave having the undesired polarization cannot be monitored using a photodetector. Therefore, the differential attenuation polarizer is unsuitable for use with a polarization controller and a feedback system to provide optimum intensity of the desired polarization.

Previous fiber optic polarizers include the crystal polarizer, in which a length of fiber optic material from which a portion of the cladding is removed to form an interaction region is placed adjacent a birefringent crystal. The birefringent crystal is chosen such that it has a first index of refraction greater than or equal to that of the fiber core for the undesired polarization and a second index of refraction equal to or slightly less than that of the fiber cladding for the polarization that is desired to be propagated in the fiber. An exponentially decaying portion of the field guided by the fiber extends beyond the core boundary into the cladding. This decaying portion of the field is called the "evanescent field". The evanescent field of light guided by the fiber interacts with the birefringent crystal, and light of an undesired polarization couples to the birefringent medium and does not propagate in the fiber past the interaction region. Light of the desired polarization is unaffected by the birefringent crystal and is guided by the fiber.

Although the crystal polarizer is capable of providing the desired extinction ratios with low insertion loss, the operational characteristics of such polarizers are temperature dependent. The temperature dependence of such devices arises primarily from the temperature dependence of the refractive indices of the crystal. If the second refractive index of the crystal changes with temperature to exceed the refractive index of the cladding, then the crystal device ceases to function as a polarizer. If the refractive index of the crystal becomes appreciably less than that of the cladding, then some of the undesired polarization will be reflected at the crystal-fiber interface and will thus remain in the fiber rather than coupling into the crytsal. A fiber optic gyroscope requires a polarizer with an extinction ratio greater than 100 dB. A crystal polarizer set to provide an extinction ratio of 100 dB at 24° C. may have an extinction ratio of only 24 to 30 dB if the temperature increases to 30° C.

SUMMARY OF THE INVENTION

The present invention provides a polarizer that yields an improved extinction ratio for the undesired polarization and an improved insertion loss for the desired polarization. A polarizer according to the invention produces a high extinction ratio with much smaller insertion loss than the prior art differential attenuation optic polarizers without having the temperature dependence of evanescent field polarizers.

The apparatus of the invention includes length of optical fiber from which a portion of the cladding has been removed to form an interaction region. The fiber is preferably curved at the interaction region so that the fiber thickness increases gradually away from the center of the interaction region along the length of the fiber. Sufficient material is removed from the fiber at the interaction region to form a planar exposed portion of the fiber core. A planar cladding portion surrounds the exposed core portion. An interaction material, which is preferably a very thin layer of a metal, is placed on the planar core and cladding portions.

The fiber is an asymmetric medium at the interaction region so that the energy propagated by the fiber is not confined to the core as in ordinary symmetric fibers. The core thickness at the interaction region is made so small that the fiber will not propagate an optical wave beyond the interaction region. Rather than propagating within the fiber, electric field components parallel to the metal surface radiate from the fiber core through the metal film into the fused silica substrate. These parallel electric field components do not couple back into the fiber.

The metal film couples the desired polarization of the TM mode into a surface plasma wave that propagates along the interface of the metal film parallel to the fiber. After propagating along the length of interaction region, the surface plasma wave couples into the fiber as a TM mode, preserving the original desired polarization.

A photodetector may be employed to form an error signal from the TE modes that are radiated from the fiber. Control circuitry processes the error signal to drive a polarization controller that adjusts the polarization of light input to the cutoff polarizer to minimize the error signal.

The method of forming the polarizer of the invention involves forming a coupler half, which preferably comprises a length of optical fiber mounted within a curved groove in a suitable substrate. The substrate may advantageously be formed from a block of fused quartz. The curved groove is formed by well known optical grinding techniques. The fiber may be retained within the groove by a suitable adhesive, and then the surface of the substrate adjacent the convexly curved portion of the fiber is ground and polished to form an optically flat surface. The grinding and polishing removes all of the cladding at the interation region and a portion of the fiber core to a depth sufficient to prohibit propagation of light of any polarization by the fiber core beyond the interaction region.

The metal layer may be formed on the used silica substrate by well-known vapor deposition techniques, and the fused silica substrate is then retained against the coupler half with the metal layer adjacent the interaction region of the fiber where the cladding and a portion of the core were removed. An index matching oil may be placed between the metal layer and the fiber. The index matching fluid is preferably placed between the metal film and the fiber surface to reduce reflections caused by a discontinuity in refractive index at the fiber/metal interface. The ends of the metal film are preferably tapered to minimize insertion loss.

As an alternative method for fabricating the polarizer, the metal layer may be formed directly on the interaction region of the coupler half using vapor deposition techniques. A layer of quartz may be deposited over the metal layer and over the portions of the fiber where part of the cladding has been removed to form the interaction region.

DESCRIPTION OF THE PREFERRED EMBODIMENT

Figure 1:
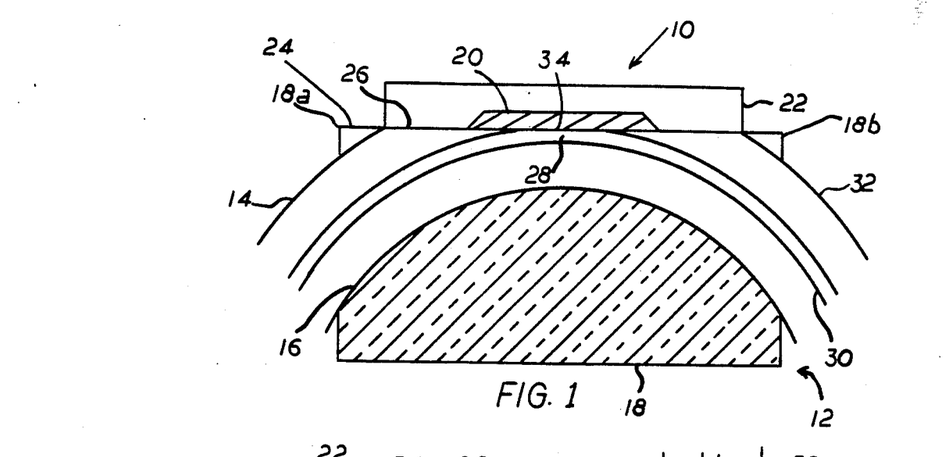
FIG. 1 is a cross sectional view of a fiber optic polarizer according to the invention showing a metal film between a layer of fused quartz and an optical fiber mounted in a curved groove in a substrate.
Figures 2, 3, 4:
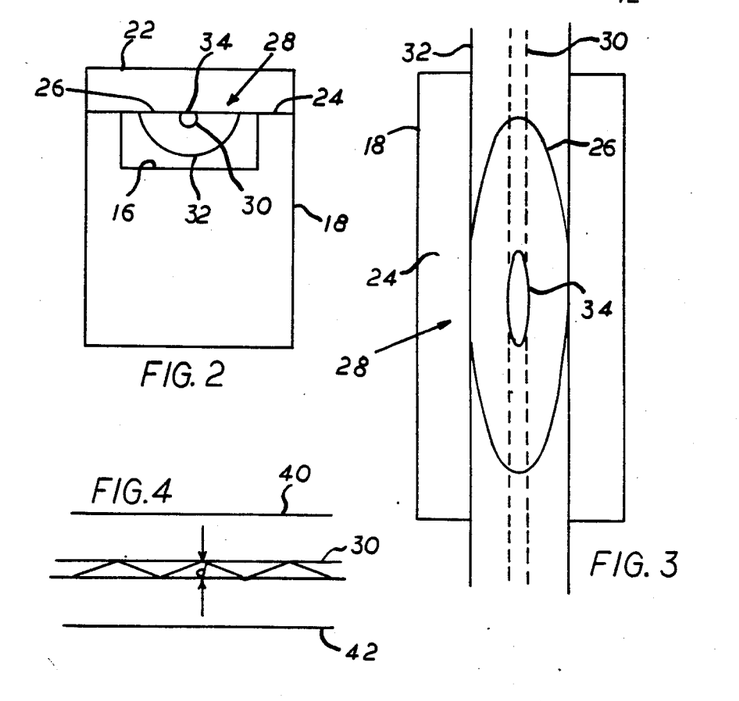
FIG. 2 is a cross sectional view of the fiber optic polarizer of FIG. 1.
FIG. 3 is a plan view of a coupler half included in the fiber optic polarizer of FIGS. 1 and 2 showing planar surfaces in the core and cladding of an optical fiber included in the coupler half.
FIG. 4 is a side view of an optical waveguide between a superstrate and a substrate.

Referring to FIGS. 1 and 2, a metal clad polarizer 10 according to the invention includes a coupler half 12 that includes an optical fiber 14 mounted in a curved groove 16 in a substrate 18.

A metal film 20 is formed on a fused silica layer 22, and the fused silica substrate 22 with the attached metal film 20 mounted on the coupler half 12.

Figure 7:
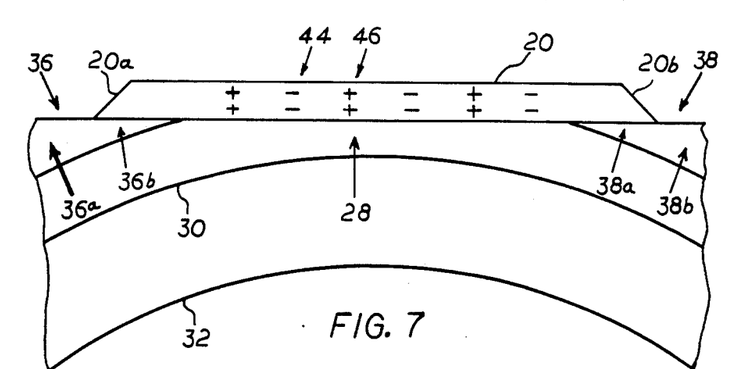
FIG. 7 is an enlarged view of the metal layer of FIGS. 1 and 2 and a portion of the optical fiber showing electrical charge density variations and propagation of a surface plasma wave in the metal caused by coupling light from the optical fiber into the metal layer.
Figure 8:
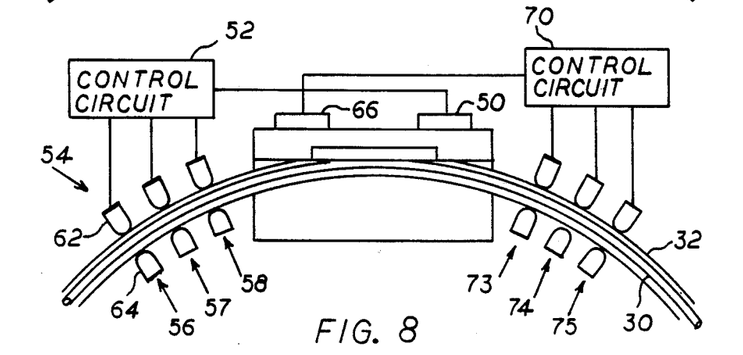
FIG. 8 is a schematic representation of a feedback control system for controlling the polarization of light input to the polarizer of FIGS. 1-3.

The curved groove 16 is formed in an optically flat surface 24 of the substrate 18. The curved groove 18 has a radius of curvature that is large compared to the diameter of the fiber 14. FIGS. 1, 7 and 8 show the radius of curvature of the fiber in exaggerated proportion relative to the fiber diameter for clarity of illustration of the interaction between light guided by the fiber and the metal layer 20. The width of the groove 16 is slightly larger than the fiber diameter to permit the fiber 14 to conform to the path defined by the bottom wall of the groove 16. The depth of the groove 16 varies from a minimum at the center of the substrate 18, respectively, to a maximum at the edges thereof. The gradual curvature of the fiber 14 prevents sharp bends or other abrupt changes in direction of the fiber 14 to avoid power loss through mode perturbation. The groove 16 may be rectangular in cross section as shown in FIG. 1; however, it is to be understood that other cross sectional configurations such as U-shaped or V-shaped may be used in forming the coupler half 12.

At the center of the substrate 18 the depth of the groove 16 is less than the diameter of the fiber 14. The fiber 14 has a central core 30 and a cladding 32. The refractive index of the core 30 is greater than that of the cladding so that light guided by the core internally reflects at the core-cladding interface.

At the edges 18a, 18b of the substrate 18, the depth of the groove 14 is preferably at least as great as the fiber diameter. Fiber optic material is removed from the fiber 14 by any suitable method, such as lapping, to form an oval-shaped planar surface 26, shown in FIG. 3, in the cladding 32. The oval shaped surface is coplanar with the optically flat surface 24 of the substrate 18. Sufficient cladding is removed to form an oval-shaped planar surface 34 in the core 30. The planar surfaces 26 and 34 are concentric and have similar shapes that are approximately elliptical. The surfaces 26 and 34 are not precisely elliptical because they are not conic sections.

The oval surface 26 and metal layer form an interaction region 28 wherein light propagated by the fiber 14 interacts with the metal film 20 and the quartz plate 22. The amount of fiber optic material removed increases gradually from zero near the edges 18a, 18b of the substrate 18 to a maximum amount at the center thereof. The tapered removal of fiber optic material causes the fiber 14 to converge and diverge gradually relative to the interaction region 28, which is advantageous for avoiding backward reflections and excessive loss of light energy at the interaction region 28.

If the fiber 14 is designed to propagate only a single mode of optical energy, the core 30 normally has a circular cross section that is about 5 $\mu$m in diameter. The cladding 32 normally provides a refractive index distribution that is symmetrically disposed about the core 30. If the refractive index of cladding 32 is symmetrical with respect to the the core 30, then almost all of the optical energy guided by the fiber 14 is confined to the core 30 if the core index is greater than the cladding index. However if the refractive index of the cladding 32 is asymmetrical with respect to the core 30, the core 30 has a cutoff diameter, d, such that if the fiber 14 has a portion where the core diameter is less than the cutoff diameter, then the optical energy cannot be confined exclusively to the core 30. The polarizer 10 uses this cutoff property to remove both polarizations from the fiber 1.

Figure 5:
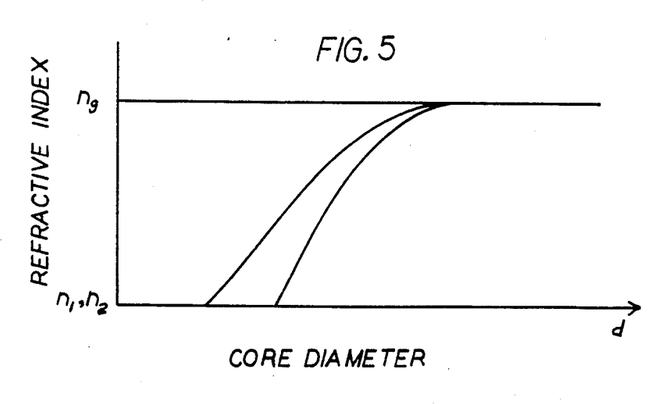
FIG. 5 is a graphical representation of the relationship between the refractive indices of an optical fiber and the diameter thereof for a symmetrical refractive index distribution about the fiber core.
Figure 6:
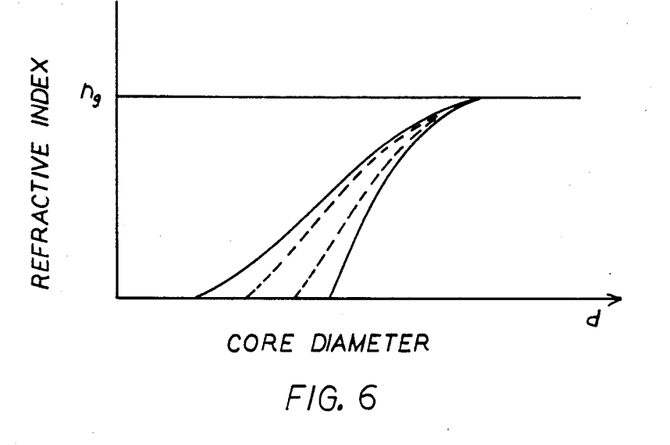
FIG. 6 is a graphical representation of the relationship between the refractive indices of an optical fiber and the diameter thereof for an asymmetrical refractive index distribution about the fiber core.

Referring to FIGS. 4–6, the concepts of symmetry and asymmetry of the refractive indices are explained in detail. The core 30 has a refractive index $n_g$. A superstrate 40 shown above the core 30 has a refractive index $n_1$, and a substrate 42 shown below the core 30 has a refractive index $n_2$. If $n_1=n_2$, then the refractive indices are said to be symmetrical with respect to the core 30; and energy will be essentially totally internally reflected as illustrated at the interfaces between the core 30 and the superstrate 40 and between the core 30 and the substrate 42. If $n_1=n_2$, then the refractive indices are symmetrical; and there is a cutoff diameter of the core 30 as explained above.

A wave being guided by the core 30 has a characteristic propagation constant $k=2\pi/\lambda$, where $\lambda$ is the optical wavelength. In the interaction region the effective propagation constant $k_{eff}$ is $$k_{eff} = n_{eff} k, \tag{1}$$

where $n_{eff}$ is the effective refractive index in the direction of propagation in the fiber 14.

Referring to the graph of FIG. 5, the effective refractive index, $n_{eff}$, is plotted against the core diameter, d. The refractive index $n_g$ of the core is greater than the indices $n_1$ and $n_2$. In order to have a guided wave in the core 30, the effective refractive index of the core 30 must be greater than $n_1$ and $n_2$, which are equal in the symmetric case. In order to have a guided wave in the fiber 14, the effective refractive index of the core 30 must be greater than $n_1=n_2$; and the diameter d must be greater than a critical value $d_c$. For the symmetric case there is no cutoff diameter in the range $d_c \leq d$.

FIG. 6 represents the asymmetric case in which $n_1 = n_2$. Because of the asymmetry in cladding index, the characteristic curve is shifted such that the effective propagation constants for both polarizations are below the cutoff value. Therefore, neither polarization will remain guided by the fiber.

Referring to FIGS. 1 and 7, on opposite sides of the interaction region 28, the cladding 32 includes tapering cladding portions 36 and 38. The quartz layer 22 shown in FIG. 1 covers a first portion 36a of the tapered cladding portion 36 of FIG. 7. The metal layer 20 covers a second portion 36b of the tapered cladding portion 36. Similarly, the metal layer 20 also covers a portion 38a of the tapered cladding portion 38, and the quartz layer 22 covers a portion 38b. The quartz layer 22 has the same refractive index as the cladding 32; therefore, there is no asymmetry in the refractive index of the core 32 at the portions 36a and 38b. However, asymmetries exist at the portions 36b and 38a becuase the metal layer 20 does not have the same refractive index as the cladding 32.

In FIGS. 1, 7 and 8, the thickness of the metal film 20 is shown in exagerrated proportion to the thickness of the quartz layer 22 in order to shown the structure of the metal film 20. The metal film is shown to extend away from the quarz layer 22, leaving a gap between the quartz layer 22 and the substrate 18. The width of this gap is determined by the thickness of the metal film, which is only about 50 Å to 100 Å. Assembly of the polarizer 10 preferably includes the steps of retaining the metal film 20 against the interaction region 28 and placing a suitable index matching oil at the juncture of the edges of the quartz layer 22 and the substrate 18. The oil will then flow into the void between the interaction region 28 and the quartz layer 22 by capillary action. The index matching oil aids in preventing internal reflections back into the core 30 in the interaction region. Such internal reflections are undesirable because part of the reflected light could have the polarization that is to be coupled from the system.

Referring again to FIG. 1, if an optical signal of mixed polarization is incident upon the polarizer 10 from the left, the asymmetry in refractive index from the portion 36b to the portion 38a causes polarization components parallel to the planar surface to radiate through the metal layer 20 into the quartz layer 22. According to the usual convention, the direction of propagation is the z-axis. Assuming a right-hand coordinate system, the x-axis points into the plane of FIG. 1, and the y-axis lies in the plane and is perpendicular to both the x- and z-axis. The polarization component along the y-axis, which is perpendicular to the surface, couples into the metal layer 20 and forms a surface plasma wave. The coupling begins at the portion 36b; and the resulting surface plasma wave propagates along the length of the metal layer 20 to the portion 38a, where the propagated energy couples from the metal layer back into the core 30.

Propagation of the surface plasma wave by the metal layer 20 is explained with reference to FIG. 7. The electric fields of the light wave have sinusoidal time variations. A TM wave has a polarization component directed perpendicular to the plane of the metal layer 20 at the interaction region 28. If the metal layer 20 is very thin, for example, 50 Å to 100 Å, then the electric field component perpendicular to the metal surface 20 causes sinusoidal density variations in the conduction electrons of the metal. For example, the electron density at a region 44 may be greater than at a region 46. Following the convention that electric fields emanate from positive charge and terminate at negative charge, the electron density variation causes an electric field to point from the regions of lower electron density, which have a net positive charge, to adjacent regions of higher electron density, which have a net negative charge. Since the field incident upon the metal layer 20 is an oscillatory traveling wave, the electron density variation in the metal layer 20 is also an oscillatory traveling wave. Since the metal layer 20 is very thin, the electron density wave is essentially a surface effect. The metal film 20 has ends 20a and 20b that are preferably tapered as best shown in FIGS. 1 and 7. The tapered ends 20a and 20b cause incident optical waves to encounter a gradual change in the metal film thickness to reduce insertion loss.

The regions of positive and negative charge in the layer 20 may be regarded as constituting a plasma, which is a collection of equal numbers of positive and negative charges in a gas-like state. It is well known from the quantum theory of metals that the conduction electrons may be regarded as a gas for many purposes. Therefore, the fluctuations in the charge density of the metal layer are surface plasma waves. A plasma oscillation is a collective longitudinal excitation of an electron gas. A plasmon is a quantized plasma oscillation. The regions of positive and negative charge may be regarded as plasmons that carry the energy that has been in the perpendicular polarization component of the TM wave in the metal layer 20. See for example Kittel, "Introduction to Solid State Physics", third edition, John Wiley, 1968 pp. 197–249 or Donovan, "Elementary Theory of Metals", Pergamon Press, 1967, pp. 54–79.

The substrate 18 may be fabricated of any suitably rigid material. In a preferred embodiment, the substrate 18 comprises a generally rectangular block of fused quartz glass approximately 1 inch long, 1 inch wide and 0.4 inch thick. The fiber 13 may be secured in the curved groove 16 by a suitable cement (not shown) such as epoxy resin. The fused quartz substrate 18 advantageously has a coefficient of thermal expansion similar to that of the fiber 14, which is important in maintaining structural integrity of the substrate 18 and the fiber 14 are subjected to any heat treatment during manufacture or use.

The metal film 20 may be formed on the quartz layer 22, which is then placed adjacent the coupler half 12 as previously described. Alternatively, the metal film 20 may be formed directly on the interaction region 28 of the coupler half 12.

The metal layer may be formed of metallic materials such as silver, aluminum, copper or gold. The metal, which acts as a waveguide for one polarization state of light propagated by the fiber 14, should be selected to provide relatively low intensity loss in the desired polarization. The metal layer 20 is most readily formed on the coupler half 12 by sputtering processes that are well known in the integrated circuit fabrication arts. Sputtering involves ionizing inert gas particles in an electric field to produce a plasma and then directing the plasma toward a target formed of the metal. The energy of the plasma particles dislodges, or "sputters off" atoms of the metal target. Some of the metal atoms will adhere to the surface 24 of the substrate 18 and to the oval surface 26 and 34 in the cladding 32 and core 30, respectively of the fiber 14. The relatively thick (4–5μ) quartz layer 22 may be formed by well known vapor deposition techniques.

A transverse magnetic or TM mode has its magnetic field vectors perpendicular to the direction of propagation. It is well known from electromagnetic theory that the electric and magnetic field vectors of an electromagnetic wave are perpendicular. Therefore, TM mode has a first electric field component, or polarization, pointing in the direction of propagation, which is parallel to the plane of the metal layer 20 at the interaction region 28. The TM mode has a second electric field component, or polarization, that is perpendicular to the plane of the metal layer 20.

Both polarizations of the TM mode have propagation constants that are below the cutoff value of the propagation constant of the fiber 14 at the interaction region 28. Therefore, the fiber 14 will not guide either polarization past the interaction region 28. However, the polarization component of the TM mode that is perpendicular to the planar surface 26 and 34 at the interaction region 28 couples into the metal layer 20 to form the surface plasma wave, which propagates in the metal layer 20 parallel to the fiber 14. After propagating beyond the interaction region 28, the surface plasma wave couples the energy of the perpendicular polarization component back into the fiber 14 with very little attenuation. Only the polarization parallel to the metal layer 20 escapes from the fiber 14.

Referring to FIG. 8, if the light is incident from the left, the radiated energy of the parallel polarization component of the TM wave travels through both the metal layer 20 and the quartz layer 22. A portion of the radiated energy impinges upon a photodetector 50 that outputs an electric current in response to the optical intensity incident thereon. An electronic control circuit 52 processes the photodetector output and provides control signals to a fiber optic polarization controller system 54; which adjusts the polarization input to the polarizer 10 to minimize the control signal. The optical throughput of the polarizer 10, therefore, has essentially a single predetermined polarization.

The polarization control system 54 preferably includes a plurality of fiber squeezers 56–58. The fiber squeezers 56–58 each preferably comprises a pair of piezoelectric actuators 62 and 64 that respond to voltages from the control circuit 52 to change the compressive force on the fiber 14 from a preload.

The optical fiber 14 is a birefringent medium, which means that the index of refraction is polarization dependent. The amount of birefringence is used herein to mean the difference between the two refractive indices of a medium that guides a light wave. Controlling the amount of birefringence permits the control of the polarization of a light signal output from a length of fiber optic material. If the wave propagated by the fiber 14 comprises two linear polarization components, increasing or decreasing the difference between the refractive indices provides means for controlling the optical path length of the fiber 14 for each of the two polarizations. If the fiber 14 is birefringent, then the two polarization components will be shifted in phase as they propagate along the fiber. Since the velocity of light in an optical fiber is $v=c/n$, where c is the free space velocity of light and n is the refractive index, the polarization component having the lower refractive index will have a greater velocity and, therefore, a smaller transit time in the fiber than the component having the highe refractive index. Controlling the refractive indices of the fiber 14, therefore, controls the polarization of light input to the cutoff polarizer 10.

It is well known that application of a compressive force to a length of the optical fiber 14 along an axis transverse to the fiber 14 changes the refractive indices by means of the photoelastic effect, resulting in stress-induced birefringence. In general, three fiber squeezers are requried to convert an arbitrary polarization into a predetermined polarization for input to the polarizer 10. If there is no appreciable birefringence in the length of the fiber 14 between adjacent fiber squeezers 56–58, then only two fiber squeezers are required.

The polarizer 10 is capable of providing an output having a predetermined polarization in counterpropagating waves in the fiber 14. If light of mixed polarization impinges upon the polarizer 10 from the right, then the undesired polarization is radiated from the fiber while the desired polarization couples into the metal layer 20, forming a surface plasma wave that propagates from right to left in the metal layer 20 as viewed in FIGS. 1, 7 and 8. A second photodetector 66 produces an electrical signal indicative of the intensity of the radiation polarization. A second control circuit 70 processes the output of the photodetector 66 and provides control signals to a plurality of fiber squeezers 73–75, which are essentially identical to the fiber squeezers 56–58 described above. Therefore, the polarizer 10 generates error signals from the two counterpropagating waves at the same region of the fiber 14 so that all optical signals emanating from the polarizer 10 have the same polarization.

What is claimed is:

1. A polarizer for propagating an optical signal of a selected polarization in a single mode optical fiber having a central core and a cladding surrounding the central core and for radiating optical signals of other polarizations from the optical fiber, comprising:
    an interaction region formed in said optical fiber;
    cutoff means for preventing propagation of optical waves of all polarizations in said optical fiber through said interaction region;
    waveguiding means adjacent said interaction region for guiding optical waves past the interaction region;
    means for coupling a wave having a particular polarization from said core to said waveguiding means at a first portion of said optical fiber; and
    means for coupling the wave having the particular polarization back into said core at a second portion of said optical fiber.

2. The polarizer of claim 1 wherein said optical fiber includes a convex portion and said interaction region comprises a flattened region on said convex portion.

3. The polarizer of claim 2 wherein said interaction region comprises:
    a planar core portion of said optical fiber from which the cladding has been removed therefrom, said planar core portion having a pair of end edges from which said planar core portion gradually decreases in thickness lengthwise along said optical fiber from a maximum thickness at said end edges to a minimum thickness at a central region of said planar core portion; and
    a planar cladding portion surrounding said planar core portion, said planar cladding portion having a tapering thickness that increases with distance from said core portion.

4. The polarizer of claim 3 wherein said cutoff means comprises a metal layer on said planar core portion.

5. The polarizer of claim 4 further including a layer of dielectric material covering said metal layer and extending over said planar cladding portion, said dielectric material having essentially the same refractive index as said cladding.

6. The polarizer of claim 5 wherein said dielectric layer comprises fused quartz.

7. The polarizer of claim 3 wherein said cutoff means comprises a metal layer covering all of said planar core portion and extending beyond said planar core portion to cover said planar cladding portion adjacent said planar core portion, such that an asymmetry in refractive index distribution around said core extends over all of said planar core portion and a part of said planar cladding portion surrounding said planar core portion.

8. The polarizer of claim 7 further including a layer of a dielectric material covering said metal layer and extending over said planar cladding portion, said dielectric material having essentially the same refractive index as said cladding such that there is asymmetry in the refractive index distribution around said core only at said planar core portion and the region of said cladding covered by said metal layer.

9. The polarizer of claim 8 wherein said dielectric layer comprises fused quartz.

10. The polarizer of claim 2, further including a substrate having a curved groove therein, said optical fiber being mounted in said curved groove of said substrate, said flattened region of said optical fiber being coplanar with a surface of said substrate.

11. The polarizer of claim 1 further including:
means for forming an error signal in response to light radiated from said optical fiber; and
means responsive to the error signal for adjusting the polarization of light input to said interaction region.

12. A method for polarizing light propagating in an optical fiber having a central core and a cladding surrounding the core, comprising the steps of:
forming an interaction region in said optical fiber;
preventing propagation of optical waves in said optical fiber through said interaction region;
placing waveguiding means adjacent said interaction region for guiding optical waves past the interaction region;
coupling a first wave having a particular polarization from said core to said waveguiding means at a first portion of said optical fiber; and
coupling the first wave back into said core at a second portion of said optical fiber.

13. The method of claim 12, further including the step of forming the interaction region at a flattened region on a convexly curved portion of said optical fiber.

14. The method of claim 13, wherein the step of forming said interaction region comprises the steps of:
removing material from said optical fiber to form a planar core portion having no cladding thereon;
forming said planar core portion to have a pair of end edges from which said planar core portion gradually decreases in thickness lengthwise along said optical fiber from a maximum thickness at said end edges to a minimum thickness at a central region of said planar core portion; and
forming a planar cladding portion surrounding said planar core portion.

15. The method of claim 14, further including the step of placing a metal layer adjacent a part of said planar core portion.

16. The method of claim 15, further including the step of covering said metal layer with a layer of dielectric material that extends over said planar cladding portion.

17. The method of claim 16 including the step of forming said dielectric layer to comprise fused quartz.

18. The method of claim 15, further including the step of forming said metal layer to cover all of said planar core portion and extend beyond said planar core portion to cover said planar cladding portion adjacent said planar core portion, such that an asymmetry in refractive index distribution around said core extends over all of said planar core portion and a part of said planar cladding portion surrounding said planar core portion.

19. The method of claim 18 further including the step of forming a layer of a dielectric material to cover said metal layer and extend over said planar cladding portion, said dielectric material being formed to have essentially the same refractive index as said cladding such that there is asymmetry in the refractive index distribution around said core only at said planar core portion and the region of said cladding covered by said metal layer.

20. The method of claim 19 further including the step of forming said dielectric layer to comprise fused quartz.

21. The method of claim 13, further including the steps of:
forming a curved groove in a substrate;
mounting said optical fiber in said curved groove; and
forming said flattened region of said optical fiber to be coplanar with a surface of said substrate.

22. A method for fabricating a polarizer for polarizing light propagating in a length of an optical fiber having a central core and a cladding surrounding the core, comprising the steps of:
removing the cladding and a portion of the core of said length of optical fiber to form an interaction region where optical waves will not propagate in said optical fiber; and
placing a metal layer adjacent said interaction region.

23. The method of claim 22, further including the step of forming the interaction region at a flattened region on a convexly curved portion of said optical fiber.

24. The method of claim 23, wherein the step of forming said interaction region comprises the steps of:
removing material from said optical fiber to form a planar core portion having no cladding thereon;
forming said planar core portion to have a pair of end edges from which said planar core portion gradually decreases in thickness lengthwise along said optical fiber from a maximum thickness at said end edges to a minimum thickness at a central region of said planar core portion; and
forming a planar cladding portion surrounding said planar core portion.

25. The method of claim 24, further including the step of covering said metal layer with a layer of dielectric material that extends over said planar cladding portion.

26. The method of claim 25 including the step of forming said dielectric layer to comprise fused quartz.

27. The method of claim 26, further including the step of forming said metal layer to cover all of said planar core portion and extend beyond said planar core portion to cover said planar cladding portion adjacent said planar core portion, such that an asymmetry in refractive index distribution around said core extends over all of said planar core portion and a part of said planar cladding portion surrounding said planar core portion.

28. The method of claim 24 further including the step of forming a layer of a dielectric material to cover said metal layer and extend over said planar cladding portion, said dielectric material being formed to have essentially the same refractive index as said cladding such that there is asymmetry in the refractive index distribution around said core only at said planar core portion and the region of said cladding covered by said metal layer.

29. The method of claim 28 further including the step of forming said dielectric layer to comprise fused quartz.

30. The method of claim 24, further including the steps of:
  forming an error signal in response to light radiated from said optical fiber; and
  adjusting the polarization of light input to said interaction region in response to the error signal.

31. A polarizer for polarizing an optical signal in a single mode optical fiber having a central core and a cladding surrounding the central core, comprising:
  a length of said optical fiber from which the cladding and a portion of the core have been removed to form an interaction region where optical waves will not propagate in said optical fiber; and
  waveguiding means adjacent said interaction region for guiding optical waves past the interaction region.

32. The polarizer of claim 31 wherein the waveguiding means comprises a metal film covering said interaction region and a portion of the cladding adjacent said interaction region.

33. The polarizer of claim 32 further comprising means for providing a continuous refractive index distribution in the cladding adjacent the interaction region.

34. The polarizer of claim 33 wherein the means for providing a continuous refractive index distribution in the cladding adjacent the interaction region comprises a dielectric material placed adjacent the cladding around the interaction region, said dielectric material having a refractive index that is substantially equal to the cladding refractive index.

35. The polarizer of claim 34 wherein the dielectric material covers the metal film and the cladding around the interaction region.

36. The polarizer of claim 31 further comprising means for providing a continuous refractive index distribution in the cladding adjacent the interaction region.

37. The polarizer of claim 36 wherein the means for providing a continuous refractive index distribution in the cladding adjacent the interaction region comprises a dielectric material placed adjacent the cladding around the interaction region, said dielectric material having a refractive index that is substantially equal to the cladding refractive index.

* * * * *